3,761,464
CARDIO-ACTIVE PYRANOSIDES OF 3β-HYDROXY-4-CHLORO-CARDA-4,20(22)-DIENOLIDES
Kurt Radscheit, Kelkheim, Taunus, Ulrich Stache, Hofheim, Taunus, Werner Fritsch, Neuenhain, Taunus, Werner Haede, Hofheim, Taunus, and Ernst Lindner, Frankfurt am Main, Germany, assignors to Farbwerke Hoechst Aktiengesellschaft vormals Meister Lucius & Bruning, Frankfurt am Main, Germany
No Drawing. Filed Jan. 25, 1971, Ser. No. 109,703
Claims priority, application Germany, Jan. 26, 1970, P 20 03 315.2
Int. Cl. C07c 173/00
U.S. Cl. 260—210.5    2 Claims

ABSTRACT OF THE DISCLOSURE

Cardio-active pyranosides of 3β-hydroxy-4-chloro-carda-4,20(22)-dienolides and process for their manufacture by reacting corresponding 3β-hydroxy steroids with acylated-1-halogeno-pyranoses in the presence of silver carbonate.

---

The present invention relates to cardio-active pyranosides of the general Formula I

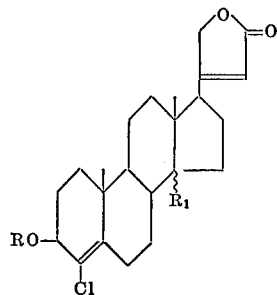

wherein R represents a pyranoside group and $R_1$ represents hydrogen or a hydroxyl group in the β-position.

The compounds of the invention are prepared by reacting a 3β - hydroxy-4-chloro-carda - 4,20(22) - dienolide (R=H in Formula I above) with an acylated 1-halogeno-pyranose in the presence of silver carbonate in an inert solvent. The water that forms during the reaction and the solvent used are removed by azeotropic distillation. The acylated pyranosides thus obtained are hydrolyzed.

The steroid compounds used as the starting substances can be prepared, if they are 14β-hydroxy steroids, for example according to the process described in Belgian Patent No. 750,418.

If 14H-steroids are used as starting substances, these can be prepared by reaction of the corresponding Δ⁴-3-oxo-derivatives with sulfuryl chloride/pyridine and reduction with the aid of metal hydrides of the 3-oxo-4-chloro-carda-4,20(22)-dienolides so obtained to yield the corresponding 3β-hydroxy-4-chloro-carda-4,20(22)-dienolides.

As acylated 1-halogeno-pyranoses that may be used for the reaction, acyl-1-halogeno-compounds of glucose, rhamnose, galactose, arabinose, digitoxose, fucose, mannose, lyxose and xylose, in the form of their acetyl, benzoyl and p-nitrobenzoyl or 1-chloro- and 1-bromo-derivatives, may be mentioned.

The process of the invention is carried out as follows: (1) an acrylated 1-halogeno-pyranose and silver carbonate are added in portions at constant intervals at the boiling temperature of the solvent to be dissolved genine, or (2) the genine and the acylated 1-halogeno-pyranose and a part of the total amount of silver carbonate used are first introduced and then further silver carbonate is added portionwise over a prolonged period of time. Depending on the reactivity of the reactants, the reaction is allowed to proceed for ½ to 8 hours. A 2–30 fold excess of acylated halogeno sugar and silver carbonate is used.

Suitable solvents are those which permit removal of the water from the reaction mixture by azeotropic distillation, for example methylene chloride, 1,2-dichloro-ethane, benzene or toluene. This operation is preferably carried out at the boiling temperature of the solvent used. New solvent is introduced according to the rate of removal by distillation, or the reaction is carried out under reflux, the solvent being refluxed through an extraction cartridge filled with a drying agent. As a further alternative the reaction mixture is slowly concentrated during the reaction without feeding new solvent.

The acyl groups are hydrolyzed in the usual manner either with the aid of sodium or potassium carbonate in an aqueous-alcoholic medium or with the aid of $NH_3$ in methanol or ethanol.

In general, the preparation of glycosides of 3β-hydroxy-carda-4,20(22)-dienolides which are unsubstituted in the 4-position of the steroid radical is not possible: the mentioned genines are dehydrated instead of glycosidated under the reaction conditions required for a glycosidation because of the sensitivity to acids of the 3-hydroxy group in allyl-position. Surprisingly, however, the starting genines used according to the invention can be glycosidated and, because of the chlorine substitution in the 4-position, do not undergo dehydration.

The glycosides so obtained, for example of the 3β,14β-dihydroxy-4-chloro-carda-4,20(22) - dienolides, are novel cardioactive products and are distinguished in particular by a strong positive inotropic and cardiovascular action. They, therefore, are useful drugs in the treatment of diseases of the heart, especially of cardiac insufficiency and of the circulation.

Animal tests may be carried out as the atrium test or as the K-excretion test on the isolated heart of guinea pigs. Thus, in animal tests, the glycosides of the invention show a positive inotropic activity comparable to that of the cardiac glycosides already known, but they often have a higher oral resorption rate than those glycosides. Further, pharmacologically important parameters such as duration of action, adhesion to the receptors of the heart muscle cell and cumulation are positively influenced by the new glycosides.

The single dose for a human being may be from about 0.1 to 3 mg. per unit. The new compounds may be therapeutically administered, above all, in oral application form as dragées, tablets or capsules, for which the usual pharmaceutical carriers, for example, starch, lactose, tragacanth, magnesium stearate and talcum, may be used. For intravenous injections, water or physiological sodium chloride solution may serve as solvents in the injection solution.

The following examples illustrate the invention. In the infrared spectra, only the characteristic bands are indicated.

EXAMPLE 1

3β-hydroxy-4-chloro-carda-4,20(22)-dienolide,3β-O-(β-D-glucopyranoside)

2.4 g. of 3β-hydroxy-4-chloro-4,20(22)-dienolide were dissolved in a mixture of 40 ml. of absolute dioxane and 50 ml. of absolute benzene and combined with 4.9 g. of freshly prepared silver carbonate. After removal of 40 ml. of benzene, a solution of 10.1 g. of aceto-bromo-glucose in 1125 ml. of benzene was added dropwise, within 4 hours, while maintaining the volume of the reaction mixture constant by corresponding removal of solvent by distillation. Over the total reaction time, 0.3 g. portion of silver carbonate was added every 30 minutes. Then, 100 ml. of absolute benzene were added dropwise and the whole was stirred for 1 hour at the boiling temperature, during which time the solvent was concentrated by distillation to a final volume of 150 ml. The reaction solution was filtered and evaporated completely under reduced pressure. The residue was dissolved in 150 ml. of absolute methanol, combined with 74 ml. of a methanolic ammonia solution that had been saturated at 0° C., and allowed to stand for 18 hours at 0° to —5° C. This solution was then evaporated to dryness under reduced pressure. The residue was triturated with 150 ml. of water. The precipitate that separated was filtered off and dried over $P_2O_5$, then dissolved in 150 ml. of hot acetone and concentrated to 60 ml. The precipitate that separated was filtered off and recrystallized from methanol. Pure 3β-hydroxy-4-chloro-carda-4,20(22)-dienolide, 3β-O-(β-D - glucopyranoside) melting at 237–238° C. was obtained. Ultraviolet spectrum: $\lambda_{max.}$=210–212 m$\mu$; $\epsilon$=24880. $[\alpha]_D^{20}$=+189.5° (dioxane).

EXAMPLE 2

3β,14β-dihydroxy-4-chloro-carda-4,20(22)-dienolide, 3β-O-(β-D-glucopyranoside)

2 g. of 3β,14β-dihydroxy-4-chloro - carda - 4,20(22)-dienolide were dissolved in 140 ml. of dichloro-ethane. The solution was heated for some time to the boiling temperature using a reflux condenser, the condensate flowing back through an extraction cartridge arranged in a Soxhlet apparatus and filled with 20 g. of Drierite (anhydrous calcium sulfates). Heating under reflux was continued and then 2 g. of aceto-bromo-glucose were added. The mixture was stabilized with 1% $CaCO_3$ and finally, 2 g. of freshly prepared silver carbonate were added to the solution. Subsequently, portions each containing 1 g. of silver carbonate and 1 g. of aceto-bromo-glucose were added three times in intervals of 1 hour to the reaction solution. The solution was then heated for 1.5 hours under reflux. During the total reaction period the condensed product was passed through the Soxhlet apparatus. After cooling, the reaction solution was filtered and completely evaporated under reduced pressure. The residue was dissolved in 100 ml. of methanol, combined with 50 ml. of a methanolic ammonia solution that had been saturated at 0° C., and allowed to stand for 16 hours at 0° C. This solution was then evaporated to dryness under reduced pressure. The residue was triturated with water, filtered off, dried over $P_2O_5$, and digested with acetone. After removing insoluble matter by filtration, the solution obtained was evaporated to dryness under reduced pressure. The new residue was dissolved in a mixture of methylene chloride and methanol and chromatographed on silica gel. Elution was effected successively with benzene, benzene/methylene chloride, methylene chloride/ethyl acetate, ethyl acetate and finally with a mixture of ethyl acetate and 5% methanol. The fractions obtained with the last-mentioned solvent mixture contained the crude glycoside, which was purified as follows: the crude glycoside was digested with di-isopropyl ether, then precipitated twice from a methanolic solution with water and finally triturated with cold diethyl ether and filtered with suction. The glucoside so obtained had a melting point of 150–160° C. (decomposition). Characteristic infrared bands: 3400–3440 (wide), 1775–1780, 1730–1740, 1610–1630, 1050–1080, 1015–1040 cm.$^{-1}$.

Preparation of the starting material used in Example 1: 3β-hydroxy-4-chloro-carda-4,20(22)-dienolide 7 g. of 3-oxo-carda-4,20(22)-dienolide were dissolved in 70 ml. of pyridine and a mixture of 3.5 ml. of sulfuryl chloride and 14 ml. of benzene was added dropwise to this solution. After stirring for 30 minutes, the mixture was poured into 800 ml. of water. The precipitate was filtered off and dried over $P_2O_5$. After purification by recrystallization from a mixture of ether and petroleum ether, the product was reduced as follows: 4 g. of chlorination product were dissolved in 450 ml. of tetrahydrofurane. 252 ml. of a solution of $LiAlH[OC(CH_3)_3]_3$ in tetrahydrofurane was added slowly to this solution at —10°. The mixture was stirred at the same temperature for 2 hours. After the usual working up by extraction and recrystallization from methanol of the crude product obtained, 2.5 g. of 3β-hydroxy-4-chloro-carda-4,20(22)-dienolide melting at 226–228° C. were obtained.

What we claim is:

1. 3β-hydroxy-4-chloro-carda-4,20(22)-dienolide,3β-O-(β-D-glucopyranoside).

2. 3β,14β-dihydroxy-4-chloro-carda-4,20(22)-dienolide, 3β-O-(β-D-glucopyranoside.).

References Cited
UNITED STATES PATENTS 3,629,234   12/1971   Eberlein et al. _____ 260—210.5

LEWIS GOTTS, Primary Examiner

J. R. BROWN, Assistant Examiner

U.S. Cl. X.R.

424—182